United States Patent [19]
Bauer

[11] 4,200,405
[45] Apr. 29, 1980

[54] ANGLE JOINT

[76] Inventor: Hans J. Bauer, Am Eichenhain 8, D-8503 Röthenbach, Fed. Rep. of Germany

[21] Appl. No.: 32,624

[22] Filed: Apr. 23, 1979

[51] Int. Cl.² ............................................. F16C 11/06
[52] U.S. Cl. .................................................. 403/142
[58] Field of Search ................. 403/142, 141, 143, 77, 403/76, 122

[56] References Cited

U.S. PATENT DOCUMENTS

| | | | |
|---|---|---|---|
| 3,503,640 | 3/1970 | Eberle | 403/122 |
| 4,084,913 | 4/1978 | Schenk | 403/141 |

FOREIGN PATENT DOCUMENTS

| | | | |
|---|---|---|---|
| 660303 | 5/1938 | Fed. Rep. of Germany | 403/141 |
| 1525177 | 9/1969 | Fed. Rep. of Germany | 403/142 |
| 1921769 | 11/1970 | Fed. Rep. of Germany | 403/142 |
| 2512253 | 9/1976 | Fed. Rep. of Germany | 403/122 |
| 506722 | 6/1971 | Switzerland | 403/141 |

838095  6/1960  United Kingdom .

Primary Examiner—Andrew V. Kundrat
Attorney, Agent, or Firm—Browdy and Neimark

[57] ABSTRACT

An angle joint or swivel joint, consisting principally of a ball and socket wherein the ball socket is constructed preferably of a tough plastic. The ball socket has a body which is bifurcated by a central slot, thereby permitting elastic yielding of the two constituent jaws when the spherical end of the ball pin is emplaced in the ball socket. In order to prevent subsequent relative movement of the two parts of the ball socket, the body of the ball socket has a transverse profiled channel which receives a mating locking bolt having the same profile. When the locking bolt has been driven home, the two previously yielding jaws are prevented from further relative motion, thereby imprisoning the ball in the socket. A cut-out in one of the jaws permits preassembly without locking and a protrusion of the locking bolt makes possible subsequent removal and disassembly.

8 Claims, 8 Drawing Figures

ANGLE JOINT

FIELD OF THE INVENTION

The invention relates to angle joints, consisting basically of a ball socket which has a depression which envelops and holds the spherical end of a ball pin. More particularly, the invention relates to angle or swivel joints in which the ball socket is split and bifurcated into two jaws that can be spread apart, thereby permitting the insertion of the ball. The angle joint further includes a locking element for locking the two jaws together after the ball of the ball pin has been put into place.

BACKGROUND OF THE INVENTION

Angle joints of the general type described above are known from a variety of publications. For example, in the German Auslegeschrift No. 1 525 177, there is described an angle joint in which the locking element is a bow spring which is pivotably attached to one end of one of the jaws of the ball socket. After the ball has been emplaced in the ball socket, the bow spring is pushed over a protrusion at the end of the other jaw, thereby rigidly locking together the two ends of the jaws. An improvement of the aforementioned swivel joint is described in the German Auslegeschrift No. 1 625 581 where the bow spring is attached to one jaw of the plastic ball socket by means of a flexible strip hinge and the bow spring has an internally bent extension which engages a suitable nose at the other jaw. A strip-like hinge of this type is easily damaged and an improvement according to the German Auslegeschrift No. 19 21 769 thus proposes attachment of the bow spring which serves as a closure element to one of the jaws of the ball socket while a slot in a protruding leg of the jaw provides elastic locking of the two jaws. This basically very attractive solution has the disadvantage that relative motion between the two jaws of the ball socket is possible, thus failing to insure the reliable seating of the ball within the ball socket.

Another angle joint is described in the German Offenlegungsschrift No. 25 12 253 which deals with a ball and socket joint wherein the ball socket has an elastically yielding part which moves out of the way when the ball of the ball pin is pushed into the ball socket and which is then locked into place by driving a bolt into a suitable recess. This construction is also very attractive but has the disadvantage that the ball belonging to the ball pin is seated only over part of its surface and that, furthermore, the complication of the construction of the ball socket presents great problems from the point of view of manufacture in plastic injection molding technology.

The British Pat. No. 838,095 describes an angle joint in which the ball socket is divided by a slot which extends over only a portion of the ball socket and not fully to an extremum thereof. After the ball has been emplaced, a bow spring is pushed into place. One disadvantage of this construction is that the insertion of the ball pin is difficult and requires a great deal of force because the relatively short slot permits only a limited spreading of the ball seat. Another disadvantage is that the bow spring which is pushed over the ball socket does not provide reliable insurance against unintentional disengagement of the ball.

The German Pat. No. 660 303 describes an angle joint having a ball socket which is split by a slot extending up to the free end of the socket and which divides the socket into two elastically enlargeable jaws. After the ball has been seated, a cap is pushed over the ends of the jaw and locked into place by means of a key or a bayonet closure. The emplacement of the closure cap in this construction is very difficult.

Other angle joints are described by the German Industrial Normalization Document (DIN) No. 71802. These angle joints have the disadvantage of gradual wear, requiring periodic replacement. Furthermore, the spring lock described in this publication is relatively expensive.

OBJECT AND SUMMARY OF THE INVENTION

It is thus a principal object of the present invention to provide an angle joint of the general type described above in which an absolutely reliable seating of the ball pin in the ball socket is achieved and in which at the same time the construction permits relatively easy manufacture by injection molding, as well as facile assembly.

These and other objects are attained according to the invention by providing a ball and socket joint in which the ball socket is divided into two elastically yielding jaws and has a transverse channel for receiving a locking bolt, thereby firmly joining the two jaws after the emplacement of the ball. At one of the jaws, the channel receiving the locking bolt is opened to permit partial assembly without locking. For this purpose, the locking bolt is pushed a small distance into the channel but engages only one of the jaws and permits the other to yield when the ball of the ball pin is emplaced in the socket. After the ball has been emplaced in the socket, the bolt is fully seated, for example, by a hammer blow, so that its two side rails engage the channels in the respective jaws of the ball socket and achieve complete and rigid locking. Furthermore, the emplacement of the locking bolt closes the ball socket and prevents soiling from that side of the socket. The embodiment provided by the invention results in nearly perfect seating of the ball within the socket, insuring at least 90% surface contact between opposing surfaces of the ball and socket. In an advantageous feature of the invention, the locking bolt has the cross section of an H or a double T so that the two jaws of the ball socket are joined by relatively high forces. Advantageously, the locking bolt may have a nose or protrusion which abuts against a part of the ball socket, thereby preventing the motion of the locking bolt beyond its intended position when it is being seated. The protrusion also permits a relatively easy release of the bolt by means, for example, by a screwdriver or the like. The cross section of the locking bolt may be constant over its entire length or may be slightly conical, thereby permitting some adjustment of the play between the ball and the socket after installation.

Still other advantages and characteristics of the invention will emerge from a reading of the description of a preferred exemplary embodiment together with the drawing.

DESCRIPTION OF THE PREFERRED EMBODIMENT

Figure 1:
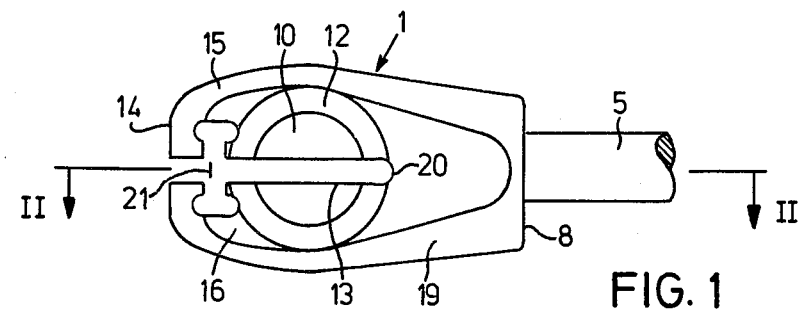
FIG. 1 is a bottom view of the ball socket of an angle joint according to the invention.
Figure 2:
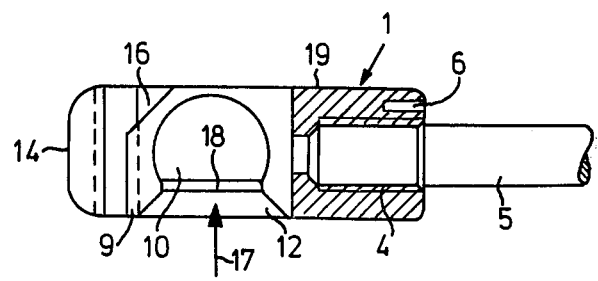
FIG. 2 is a section through the illustration of FIG. 1 along the line II—II illustrating the ball socket and the ball pin prior to assembly.

The angle joint according to the invention is illustrated in the drawing by a ball socket 1, a ball pin 2 and a locking bolt 3 and these parts constitute the major components of the joint. The construction of the ball pin 2 with its elongated rod-like shank and the spherical end 11 is of known construction and will not be discussed in detail.

Figure 3:
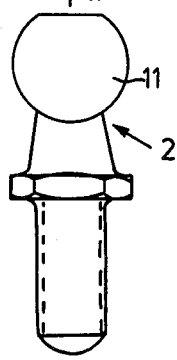
FIG. 3 is a top view of the ball socket according to FIGS. 1 and 2.
Figure 3:
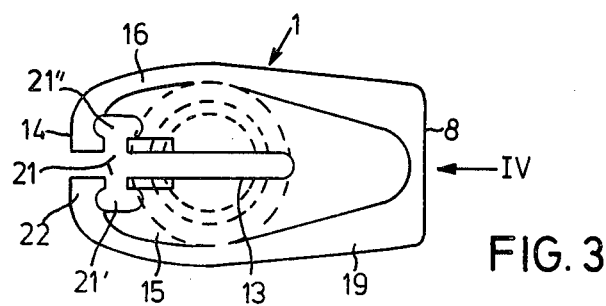
Figure 4:
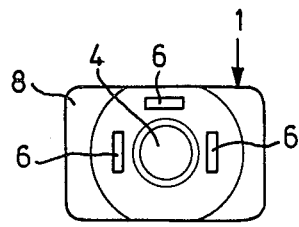
FIG. 4 is a rear view of the ball socket according to the arrow IV in FIG. 3

The ball socket includes a substantially box-like body, the sides of which may be slightly bulging as seen in FIG. 3. It is provided with a cylindrical blind bore 4 which may receive a pin 5, a rod or the like. The body of the ball socket has blind recesses 6, for example three parallel blind recesses 6 displaced with respect to another by 90° as best seen in FIG. 4 and these recesses serve to permit a limited elastic yielding of the body of the ball socket when the pin or rod 5 is inserted in the opening 7 of the blind bore 4. As illustrated, the recesses 6 may extend over approximately one third of the length of the hole 4.

Figure 5:
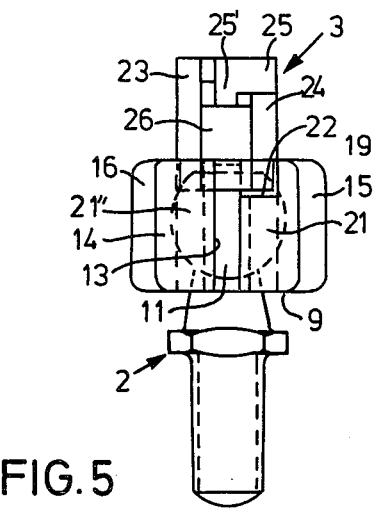
FIG. 5 is a front view of the ball socket illustrating a partially seated locking bolt.

The ball of the ball pin 2 is received in the ball socket by a depression 10 of substantially spherical shape whose opening toward the bottom 9 of the ball socket has an approximately frusto-conical shape. The size of the opening in the plane of the surface 9 is somewhat larger than the diameter of the sphere 11 of the ball pin 2 so as to permit easy alignment. The body of the ball socket 1 is split centrally by a slot 13 which begins at the face 14 thereof and extends until just ahead of the blind bore 4. The slot 13 lies in the common central plane of the spherical depression 10 as well as of the frusto-conical opening 12, thereby splitting the ball socket 1 into two symmetric jaws 15, 16 which are capable of slight relative spreading when the ball 11 of the ball pin 2 is pushed through the frusto-conical opening 12 into its seat 10 along the arrow 17. The elastic yielding of the jaws permits the passage of the ball 11 through the narrowed region 18 which lies at the transition of the frusto-conical portion 12 and the spherical portion 10 and whose diameter is definitely less than the diameter of the ball 11. The end of the slot 13 at the interior of the body of the ball socket is provided with a rounded area 20 so as to prevent rupture of the ball socket along the axis of the slot 13 when the ball is inserted and the jaws are spread. Communicating with the slot 13 on both sides thereof i.e., in both jaws 15 and 16, are respective transverse channels 21' and 21" which extend from the top surface 19 to the bottom surface 9 of the ball socket and which have a cross section that mates with the cross section of the locking bolt 3 as best seen in FIG. 5.

Figure 6:
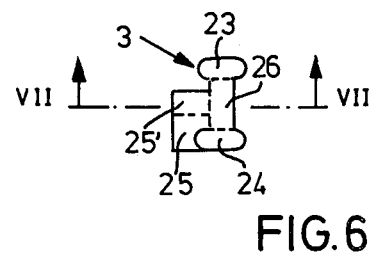
FIG. 6 is a top view of a locking bolt according to the invention.
Figure 7:
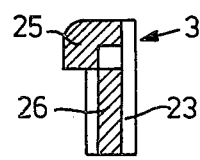
FIG. 7 is an axial section through a locking bolt according to the line VII—VII in FIG. 6.

The cross section of the locking bolt 3 has the appearance of an H or a pair of Tees joined at the legs. This cross section is best seen in FIG. 6. After the ball has been seated in the socket 10, the bolt 3 is driven into the transverse channel 21 from the top surface 19 of the body of the ball socket 1 whereby both jaws 15, 16 are rigidly locked together in the region between the socket depression 10 and the front surface 14 of the ball socket 1. Accordingly, the jaws 15, 16 are thereafter incapable of spreading during the use of the joint and any unintentional release of the ball 11 from the socket 10 is securely prevented.

Figure 8:
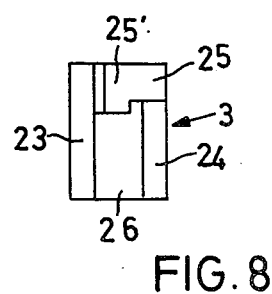
FIG. 8 is a front elevational view of a locking bolt.

A further feature of the invention is the provision in one jaw, for example jaw 15, of a cut-out 22 which extends from the top surface 19 of the ball socket 1 over approximately one quarter of its height and whose width is substantially equal to the partial channel 21' which is thus open in this region with respect to the front of the ball socket 1. The purpose of the cut-out 22 is to permit the partial assembly of the bolt 3 with the ball socket 1 by limited insertion in the transverse channel 21" without simultaneous engagement of the channel 21'. In this way the bolt 3 is temporarily attached to the ball socket 1 but does not yet provide the intended locking of the jaws 15, 16 and permits the subsequent emplacement of the ball 11 in the socket 10 with the attendant spreading of the jaws 15, 16. After this emplacement, the bolt 3 is driven home in any suitable manner. A nose or extension 25 on the bolt 3 cooperates with the cut-out 22 in the jaw 15 and, when fully placed, fills the cut-out 22 and provides a complete closure of the transverse channel 21. At the same time, the nose 25 serves as a stop which limits the insertion of the bolt 3 in the channel 21 and also prevents its motion beyond the bottom surface 9 thereof. The central portion 26 of the locking bolt 3 closes off the slot 13 and thus also closes off the socket 10 from this direction. The nose 25 is laterally extended beyond the cut-out 22 across the slot 13 (see FIGS. 6 and 8) which permits a relatively simple removal of the slot of the bolt 3 from the jaws 15, 16, for example by inserting a screwdriver or the like below the nose 25 in the frontally open region of the slot 13 and thereby pushing the bolt 3 upwardly. In the region of the slot 13, the nose 25 is reinforced for this purpose as indicated by the numeral 25'.

Advantageously, the body of the ball socket 1 as well as the locking bolt 3 are made from a tough elastic injection moldable plastic material and are suitably manufactured by injection molding.

The foregoing relates to a description of a preferred exemplary embodiment of the invention which is given by way of a non-limiting example permitting other embodiments and variants of these, all within the scope and spirit of the invention.

I claim:

1. An angle joint including a ball socket and a ball pin, the ball of said ball pin residing in the ball socket, said ball socket having a body which is bifurcated by a central slot, thereby defining two elastically yielding jaws, and further including a locking device for preventing relative motion of said jaws after emplacement of said ball in said ball socket, and wherein, according to the invention, said ball socket is provided with a transverse channel extending normally with respect to said central slot, said transverse channel having respective channel portions which lie in said jaws and defining a cross section profile and wherein there is provided a locking bolt being received in said transverse channel to thereby lock together said jaws and wherein there is provided in one of said channel portions a cut-out portion which opens from said one channel portion to said central slot.

2. An angle joint according to claim 1, wherein said cross-sectional profile is substantially similar to a pair of opposing T's.

3. An angle joint according to claim 1, wherein said locking bolt has a protrusion substantially corresponding to the shape of said cut-out portion.

4. An angle joint according to claim 1, wherein said locking bolt has an extended nose overlapping a portion of said central slot.

5. An angle joint according to claim 1, wherein the cross-sectional profile of said slot is constant over its length.

6. An angle joint according to claim 1, wherein the cross-sectional profile of said locking bolt is reduced in size over its length, thereby imparting a slightly conical configuration to said locking bolt.

7. An angle joint according to claim 1, wherein the blind end of said central slot is rounded.

8. An angle joint according to claim 1, wherein said ball socket is constructed of a tough elastic injection moldable plastic.

* * * * *